Figure 2:
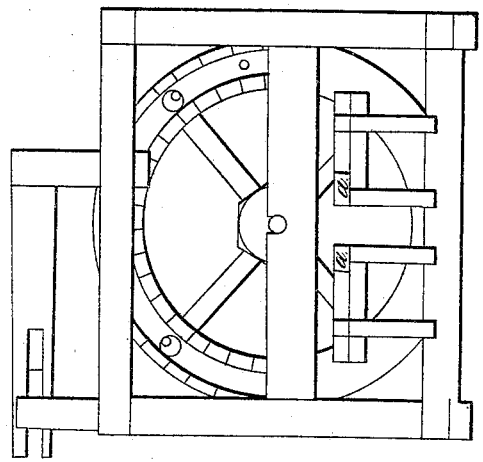
Figure 1:
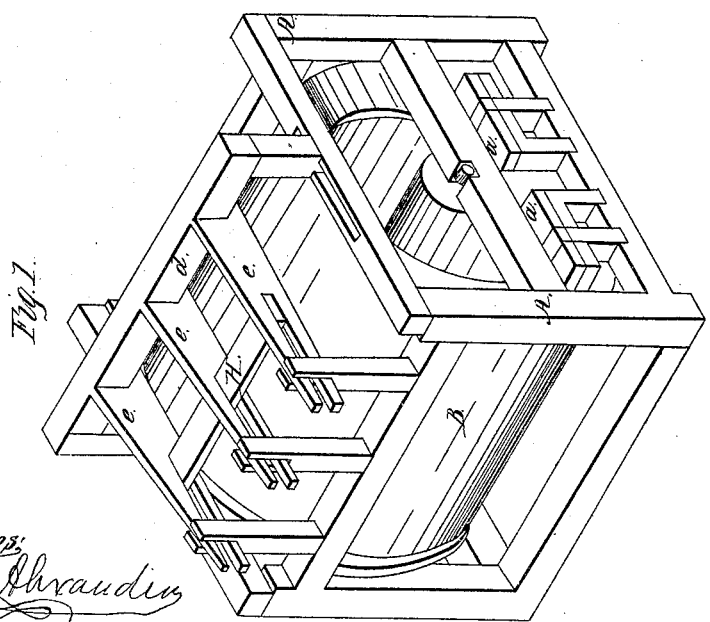

B. Bogue,
Horse Power,
No. 29,855. Patented Sep. 4, 1860.

Witnesses:

Inventor:
B. Bogue

UNITED STATES PATENT OFFICE.

BENJAMIN BOGUE, OF TRENTON, IOWA.

HORSE-POWER.

Specification of Letters Patent No. 29,855, dated September 4, 1860.

*To all whom it may concern:*

Be it known that I, BENJAMIN BOGUE, of Trenton, in the county of Henry and State of Iowa, have invented certain new and useful Improvements in Horse-Powers; and I do hereby declare that the following is a full, clear, and exact description of the same, reference being had to the accompanying drawings and to the letters of reference marked thereon.

In the annexed drawings making a part of this specification, A represents a substantially made square frame, in which and upon which the wheel B, is placed and has its bearings. The wheel B, is made of any desired size and so constructed that horses may walk upon its periphery as well as upon the internal surface of the covering of said wheel.

$d$, represents a lead bar, attached to the frame, and $e$, $e$, represent division bars for separating the horses.

Near the lower portion of the frame and upon it are erected supports, to which are attached bars or arms $a$, $a$, which extend into the wheel and serve as lead bars for horses on the inside of said wheel.

In using this wheel, it will be seen that horse power may be applied by placing the horses upon the periphery or upon the internal surface of its covering, power being applied to both top and bottom of the wheel at the same time. I am thus enabled to use double the ordinary amount of power upon any given sized wheel.

Having thus fully described my invention, what I claim as new, and desire to secure by Letters Patent, is—

The arrangement of the frame A, and the wheel B, the internal lead bars $a$, $a$, and the external lead and division bars ($d$,) and $e$ substantially in the manner specified for the purpose of applying horse power, internally, and externally, to the wheel, as is herein set forth.

BENJAMIN BOGUE.

Witnesses:
WILLIAM McGILL,
SIMON LOZIER.